(12) United States Patent
 Tai

(10) Patent No.: US 8,370,199 B2
(45) Date of Patent: *Feb. 5, 2013

(54) PROMOTION PROCESSOR AND MANAGEMENT SYSTEM

(75) Inventor: Roland D. Tai, Cos Cob, CT (US)

(73) Assignee: Advanced Marketing Systems, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,145

(22) Filed: Jun. 5, 2012

(65) Prior Publication Data

US 2012/0290378 A1 Nov. 15, 2012

Related U.S. Application Data

(63) Continuation of application No. 12/361,041, filed on Jan. 28, 2009, now Pat. No. 8,219,445, which is a continuation of application No. 10/351,615, filed on Jan. 24, 2003, now abandoned, which is a continuation-in-part of application No. 10/113,214, (Continued)

(51) Int. Cl.
 *G06Q 30/00* (2012.01)
(52) U.S. Cl. .................................. 705/14.1
(58) Field of Classification Search .................. 705/14.1
 See application file for complete search history.

(56) References Cited

U.S. PATENT DOCUMENTS

| | | |
|---|---|---|
| 3,826,422 A | 7/1974 | Dickinson |
| 3,978,455 A | 8/1976 | Valassis et al. |
| 4,554,446 A | 11/1985 | Murphy et al. |
| 4,601,490 A | 7/1986 | Brandon |
| 4,791,281 A | 12/1988 | Johnsen et al. |
| 4,908,761 A | 3/1990 | Tai |
| 4,957,311 A | 9/1990 | Geisenheimer |
| 5,056,019 A | 10/1991 | Schultz et al. |
| 5,105,941 A | 4/1992 | Dolan et al. |
| 5,173,851 A | 12/1992 | Off et al. |
| 5,192,854 A | 3/1993 | Counts |
| 5,197,599 A | 3/1993 | Dolan |
| 5,201,010 A | 4/1993 | Deaton et al. |
| 5,369,571 A | 11/1994 | Metts |

(Continued)

FOREIGN PATENT DOCUMENTS

| | | |
|---|---|---|
| EP | 0 331 442 A2 | 9/1989 |
| WO | WO 89/07868 | 8/1989 |

OTHER PUBLICATIONS

Canadian Office Action issued in Canadian Patent Application No. 2,320,089, mailed Nov. 3, 2009.

(Continued)

*Primary Examiner* — Daniel Lastra
(74) *Attorney, Agent, or Firm* — McDermott Will & Emery LLP

(57) ABSTRACT

A data processing system employs a unique coded promotional vehicle to attract customers into retail establishments for the purchase of discounted goods. The promotional vehicle includes coupon styled graphics integrated with a code to allow data tracking by the store pursuant to purchases by that customer. The promotional vehicle is easier and less costly to distribute compared to the prior art, avoids cutting of coupons, and post purchase redemptions. The system further allows more targeted discounting at a lower cost, and substantially reducing fraud by eliminating post purchase coupon processing and redemption. Additionally, the system provides for selective deactivation of the code for each discount used by redemption of the vehicle without deactivating the code for the discounts not used so that the code may remain selectively active for future use.

30 Claims, 13 Drawing Sheets

Related U.S. Application Data filed on Mar. 28, 2002, now abandoned, which is a continuation-in-part of application No. 09/610,216, filed on Jul. 5, 2000, now abandoned, which is a continuation of application No. 09/026,289, filed on Feb. 19, 1998, now abandoned.

(56) References Cited

U.S. PATENT DOCUMENTS

| | | |
|---|---|---|
| 5,413,384 A | 5/1995 | Principe et al. |
| 5,501,491 A | 3/1996 | Thompson |
| 5,581,064 A | 12/1996 | Riley et al. |
| 5,687,322 A | 11/1997 | Deaton et al. |
| 5,710,886 A | 1/1998 | Christensen et al. |
| 5,822,735 A | 10/1998 | De Lapa et al. |
| 5,832,457 A | 11/1998 | O'Brien et al. |
| 5,857,175 A | 1/1999 | Day et al. |
| 5,865,470 A | 2/1999 | Thompson |
| 5,905,246 A | 5/1999 | Fajkowski |
| 5,918,211 A | 6/1999 | Sloane |
| 5,974,396 A | 10/1999 | Anderson et al. |
| 5,995,942 A | 11/1999 | Smith et al. |
| 6,026,370 A | 2/2000 | Jermyn |
| 6,230,143 B1 | 5/2001 | Simons et al. |
| 6,276,724 B1 | 8/2001 | Zorn |
| 6,328,339 B2 | 12/2001 | Dixon, III et al. |
| 6,336,099 B1 | 1/2002 | Barnett et al. |
| 6,340,179 B2 | 1/2002 | Mitchell |
| 6,424,949 B1 | 7/2002 | Deaton et al. |
| 6,568,599 B2 | 5/2003 | Lahey et al. |
| 8,219,445 B2 * | 7/2012 | Tai .................................. 705/14.1 |
| 2001/0042008 A1 | 11/2001 | Hull et al. |
| 2002/0026359 A1 | 2/2002 | Long et al. |

OTHER PUBLICATIONS

Hausfater et al., "Data Sleuthing: common-sense detective work can make overlay demographics more effective" Direct, vol. 3, No. 1, p. 42(2), Jan. 1991.

\* cited by examiner

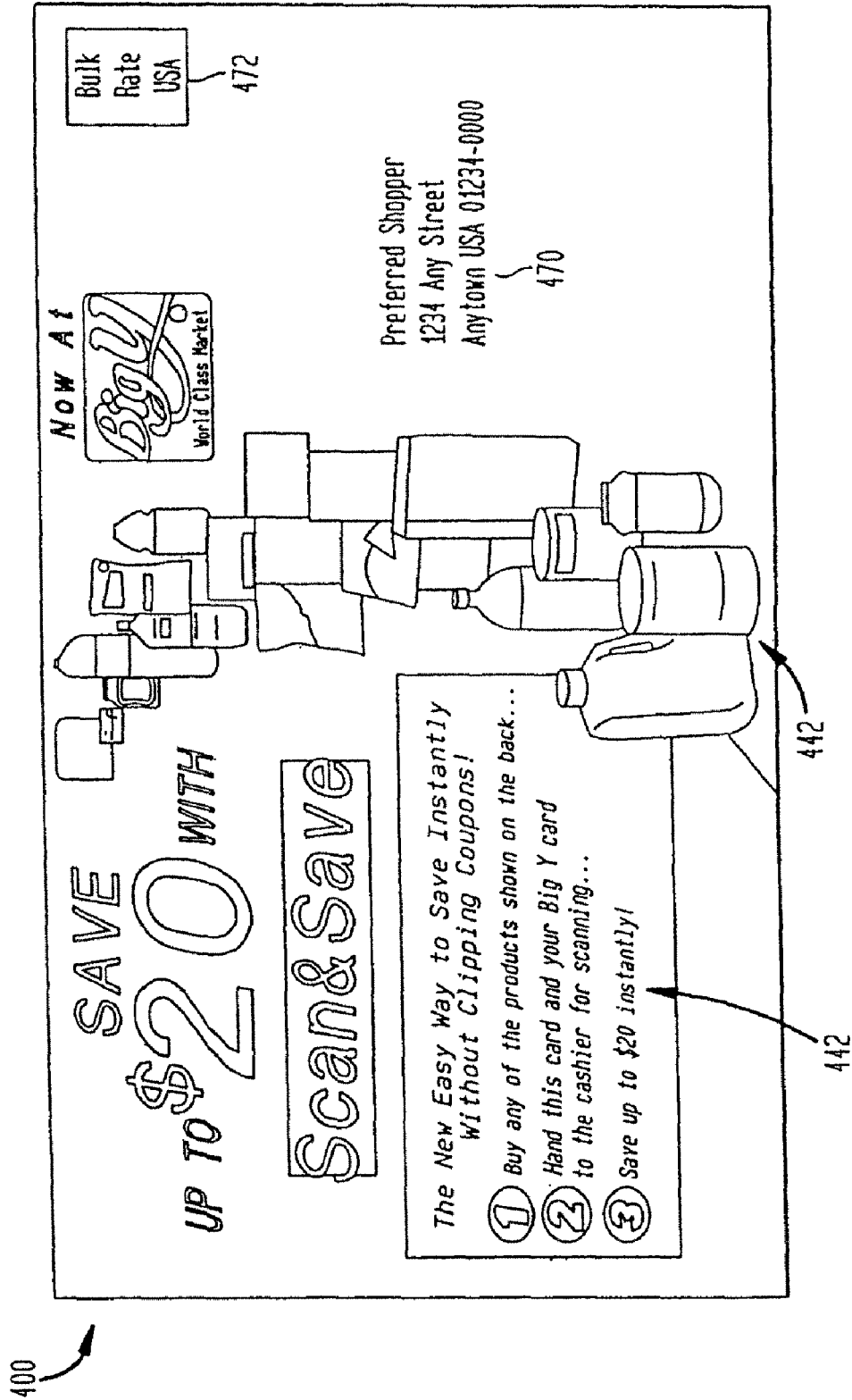

PROMOTION PROCESSOR AND MANAGEMENT SYSTEM

This application is a Continuation of U.S. patent application Ser. No. 12/361,041, filed on Jan. 28, 2009 now U.S. Pat. No. 8,219,445, which is Continuation of U.S. patent application Ser. No. 10/351,615, filed on Jan. 24, 2003 now abandoned, which is a Continuation-In Part of U.S. patent application Ser. No. 10/113,214, filed on Mar. 28, 2002 now abandoned titled "Promotion Processor and Management System," which is a Continuation-In-Part of U.S. patent application Ser. No. 09/610,216, filed on Jul. 5, 2000 now abandoned titled "Points of Sale: Match-Code Responsive, Selective, Whole-Transactions-Data Capture Method, Systems and Apparatus," which is a Continuation of U.S. patent application Ser. No. 09/026,289 filed on Feb. 19, 1998 now abandoned. The entire contents of each of the aforementioned U.S. patent application Ser. Nos. 12/361,041, 10/351,615, 10/113,214, 09/610,216 and 09/026,289 are incorporated by reference herein.

FIELD OF THE INVENTION

The present invention is directed to a novel promotion platform, and more specifically, a data processing system and method for implementing a customer incentive promotional program for enhancing retail sales of select products, such as groceries and the like.

Promotions in the form of customer incentives are a well-traveled vehicle in product marketing. These incentives are designed to increase demand for a given class of products, triggering a growth of sales that move the product "off the shelves" in the retail outlet. Incentive based promotions come in all sizes and shapes, and almost every variation on this theme has been attempted, with the objective to differentiate your products from those of your competition, and thus expand the sales of these select products.

BACKGROUND OF. THE INVENTION

The full spectrum of promotions can be seen at retail supermarkets during the course of the last thirty years. Past promotions include the use of trading stamps, such as those distributed by the Sperry and Hutchinson Company— ("S&H" Green Stamps). Purchasers of the promoted products would receive these stamps—exchangeable for gifts—and thus preferentially selected those stores that distributed these stamps in conjunction with the product sales.

Another promotional tool is the discount coupon, in which manufacturers of select goods, such as ice cream or coffee, would distribute coupons to potential customers. These coupons are presented during the purchase (check-out) of a can of coffee at the a participating retailer, the retail operator advances the coupon's face value as an instant discount as agent for the manufacturer. Face values average 20% to 30% of the product's retail price, and 80% of Americans report using them. Once redeemed, the participating retailer must submit the coupon back to the manufacturer for reimbursement of the face value discount plus a handling fee for accepting and processing the coupon. Manufacturers continuously and broadly distribute coupons as they significantly enhance customer demand for their brand over competitive brands. These savings were available at all participating retailers, especially mass grocery retailers such as supermarkets supercenters and discount department stores.

Nevertheless, retailers were less impressed with the manufacturer based discount coupons, primarily because customer purchase decisions were swayed in a direction independent of a given retailer as the savings were tied to the product, not the retail outlet. To counter the manufacturer's efforts and bring customers to their specific store(s), retailers introduced weekly sales, which were and are still communicated through advertising circulars mass distributed in newspapers. Retailers even introduced their own coupons within their sales circular on broadly used products to limit the quantity that consumers could buy. With the exception of retailer-couponed items, sales items were simply "marked-down" or "price-reduced" within the store with all consumers buying sale products during the sale period receiving the reduced pricing. These store-based discounts were in contrast to the manufacturer's coupons and, more popular with store owners.

The maturation of American population has caused systemic changes to America's grocery industry. Specifically, over the last ten years, the grocery business has been consolidating with retailers taking control via great regional and national chains displacing small to medium local market operators. This concentration at the retail level has dramatically increased the leverage the chains command in negotiating co-marketing efforts with manufacturers of branded goods. As of year end 2001, the nation's top five (5) mass grocery retailers command just under 50% of total U.S. grocery sales with the #1 retailer alone accounting for 15%. It has also led to the largest increase in store brands and store-based discounting. These years of intense discounting (by both retailers and manufacturers) has caused American shopping behavior to become price-sensitive, especially among its heaviest shopping households. This sensitivity has grown so acute that the vast majority of purchases now occur only when products are on sale. Manufacturers and retailers alike wish to focus their discounting efforts toward retaining the shopper loyalty of their best customers. This consistent goal has caused retailers to develop the Frequent Shopper card, which include coded identification information issued by the retail store, for free, to any consumer willing to accept one.

The use of Frequent Shopper cards has grown dramatically during the last five to seven years and is now offered by most major supermarket chains. From a consumer standpoint, 55% of American households now use Frequent Shopper cards with the majority carrying cards from competitive retailers. The profile of card using households matches with the demographic profile of heavy shopping households. Usage surveys indicate that 91% of cardholders use them in every shopping trip. Analysis has shown that only a small portion of cardholders account for a disproportionately high percentage of purchases. These cards include a simple bar code unique to that specific customer, and are either credit card size or smaller for attachment to a key chain, making compliance convenient for the users. During checkout, the card code is scanned and the register entries for the goods purchased at checkout are stored within the digital transaction file with the unique code corresponding to that customer. Discounts are provided for the on-sale products purchased. The store computer from every store in the chain then transmits every transaction file (including both those impacted by a Frequent Shopper card code as well as those NOT impacted by a Frequent Shopper card code) to a remote central file for the entire chain. This file, stores the details of the transaction (including all items purchased, all retailer discounts, and all manufacturer coupons). Retailers with Frequent Shopper Card programs also have a separate database of cardholders including cardholder name, home address and telephone number. Some retailers also ask for e-mail address and number of family members. Retailers with Frequent Shopper Card programs have the capability to link transaction files of cardholders and build a database of the purchase behavior of their cardholder customers, thereby allowing the store to track buying patterns of its registered customers.

Notwithstanding these changes, the industry largely depends on one form of manufacturer coupon-based promotion over all others. This promotion is known as the Free Standing Insert or FSI, which is dedicated to promotion offers that are coordinated and produced by an integrator service and then shipped to newspapers for insertion and delivery with Sunday newspapers. Promotion offers for grocery products generally entail a product advertisement with a coupon as an inducement to buy.

There are a number of problems with the FSI as presently applied. For example, consumers dislike cutting and organizing the various coupons for selective submission during checkout; a well-known inconvenience that is simply tolerated but not enjoyed. Additionally, store owners dislike having their cashiers handle coupons as they slow down and actually interrupt the check-out, as well as the associated paperwork required in collecting, processing, and submitting coupons for reimbursement, which is time consuming and expensive.

The manufacturers are also troubled by the FSI coupon due to both its high media wastage level (98%) and its high fraud level (15% of redemptions). Fraud primarily occurs as rings of criminal cells collect coupons prior to distribution, mass cut and launder them, and then using small, individually-owned stores as a front, and submit the coupons for repayment, without any corresponding product sale. Indeed, this form of fraud is believed to be pervasive and has been linked to funding of terrorist organizations.

Even with these problems, FSI coupons remain the dominant form of manufacturer discounting and promotion. Obvious benefits from the FSI format is the low cost per distributed coupon and the pro-active distribution that brings shoppers into stores. Simply stated, no system has the proper balance of cost and effectiveness to displace or challenge FSI in the market.

OBJECTS AND SUMMARY OF THE PRESENT INVENTION

It is an object of the present invention to provide a pro-active promotional vehicle to enhance retail sales of select goods.

It is yet another object of the present invention to provide an integrated multi-discount incentive vehicle capable of pro-active consumer distribution.

It is yet another object of the present invention to provide an integrated multi-discount incentive vehicle having embedded coding to permit selective tracking of consumer-product related data.

It is yet another object of the present invention to provide an integrated promotion system that avoids retailer in-store post redemption processing of coupons and substantially reduces the potential for fraud associated with such post-redemption processes.

It is a further object of the present invention to provide coding on an integrated multidiscount incentive vehicle that can be used in conjunction with store issued discount membership cards to facilitate system operation.

It is still another object of the present invention to provide a multi-product vehicle capable of distribution to select customers wherein promotional information regarding a diverse set of products is provided in conjunction with discounts on the products identified.

It is another object of the present invention to provide a promotion vehicle that has the outward appearance of an FSI but is implemented as a single promotion including selective coding and a shopping list format to ease implementation during the collection of specified goods in a store.

It is a further object of the present invention to provide a promotion system for enhancing retail based distribution of goods through the use of a multi-product discount vehicle, selectively distributed to potential customers, via direct mail or newspaper insert.

It is a further object of the present invention to provide a data processing system programmed to track redemptions of a specialized multi-product incentive vehicle, so as to insure proper discounting against select products and coordinated fulfillment of the incentive-based transaction.

The above and other objects of the present invention are realized in a novel data processing system operable with a specialized multi-product discount vehicle associated with a specified code. The multi-product discount vehicle has within its structure, a coordinated presentation of coupon-like indicia, coupled with graphics and text to draw customer attention to the salient features of the promoted products. Importantly, there is no requisite of cutting or organizing individual coupons by the customer. The assembly of information in the multi-product discount vehicle is configured to allow distribution to households, via mail, newspaper, or any other manner. The discount promotions within the vehicle are organized to facilitate ease of tracking and purchasing the identified products in a shopping environment followed by a single redemption at check-out. A tracking code is appended to each vehicle, with the code including several distinct, machine-readable data sets. For example, the code may include an identifier for the media used to transmit the vehicle, such as, but not limited to, a newspaper, and perhaps details regarding that newspaper. Upon reading this identifier, alone or on an aggregated basis, core marketing data is rendered regarding, such as the lag time associated between vehicle distribution and subsequent redemption, the capture rate for that publication, etc. The code may also identify the specific promotions applicable to that vehicle, and information to permit selective pre-sorting of data associated with that customer's purchases.

In accordance with the varying features of the present invention, the system includes a Point-Of-Sale (POS) processor for reading the appended code and processing this code in conjunction with the general functions associated with the check-out process. Because a single redemption vehicle is used that includes the specified coded information for post redemption processing, the vehicle is simply discarded at the checkout without the need to have it saved or destroyed. This eliminates the physical tracking process typically employed with conventional coupons, substantially reducing the post-redemption actions of the retail outlet. Because the vehicle is not used for clearing and discount repayment purposes, the possibilities of fraud are also greatly diminished.

In addition to a single code on the vehicle, operation may involve select portions of the coded data located in separate locations for reading during the check-out process. For example, the existing network of membership cards now sponsored by the retail outlet may satisfy code data relating to customer identification. The code on the vehicle may thus avoid duplicating this information, and focus on the promotion, the origination and path of the vehicle. By using two portions of a single code, one portion designated to the membership data and the other portion designated to the product discount data, processing via existing code software avoids separate data processing for the discount vehicle.

The foregoing processing steps are accomplished by barcode reader or similar device, with selective data processing performed locally within the retail outlet and/or remotely via network connections. Because the code includes identifiers or "flags" that are immediately recognized by the system during check-out, data may be pre-sorted with real time collection and synthesis of key parameters by the system. This pre-sorting allows quick access to core data sets important for real time marketing decisions.

BRIEF DESCRIPTION OF THE FIGURES

The present invention is illustratively described herein below in conjunction with the following drawings of which:

FIG. 3b is a rear vertically exploded view of the multi-coupon vehicle for use as a freestanding insert of FIG. 3a;

FIG. 3c is a diagonally exploded view of the multi-coupon vehicle for use as a freestanding insert of FIG. 3a;

FIG. 4b is a rear view of the multi-coupon vehicle of FIG. 4a;

FIG. 5b is a rear view of the multi-coupon vehicle of FIG. 5a;

FIG. 6b is a rear view of the multi-coupon vehicle of FIG. 6a.

DETAILED DESCRIPTION OF THE INVENTION

First briefly in overview, the present invention is directed to a data processing system for implementing a novel multi-discount incentive based promotion that enhances customer demand for select products by providing discounts to customers in a low cost simplified process. There are three interrelated aspects of the present invention that bear consideration in the present disclosure. First, the inventive system employs a specifically constructed multi-discount incentive promotion vehicle that is pro-actively distributed to a select customer profile. Second, the system includes with the multi-discount incentive promotion vehicle a specific multi-function code embedded and/or associated with the vehicle to positively identify the customer and permit proper tracking of the promotion through redemption. Third, the system includes a code reader at the point of sale to extract the code during the redemption process and a POS system to properly process the discounts at the time of redemption, followed by post-redemption processing of the accessed data assembled during checkout.

The incentive vehicle can take a number of different shapes, each of which, however, provides certain select functions. For example, the coupon vehicle may be formed of a single sheet of heavy grade paper, comprising two folds thus allowing an abridged presentation of discounted goods to consumers that sparks further interest and action. When unfolded, key information is presented directing the consumer to the discounts and the ease of processing. Within the various panels of the vehicle the discounts are prominently displayed with feature descriptors and the applicable discounts in the form of clipless coupons. Separately, the vehicle includes organizational tools to allow an enhanced shopping experience, with features such as a checklist for the promotions, and a tally of savings. Finally, the panels include a low profile code that includes various data, including for example, details specific to the promotion, authorization codes (for security), and retail outlet.

Figure 1:
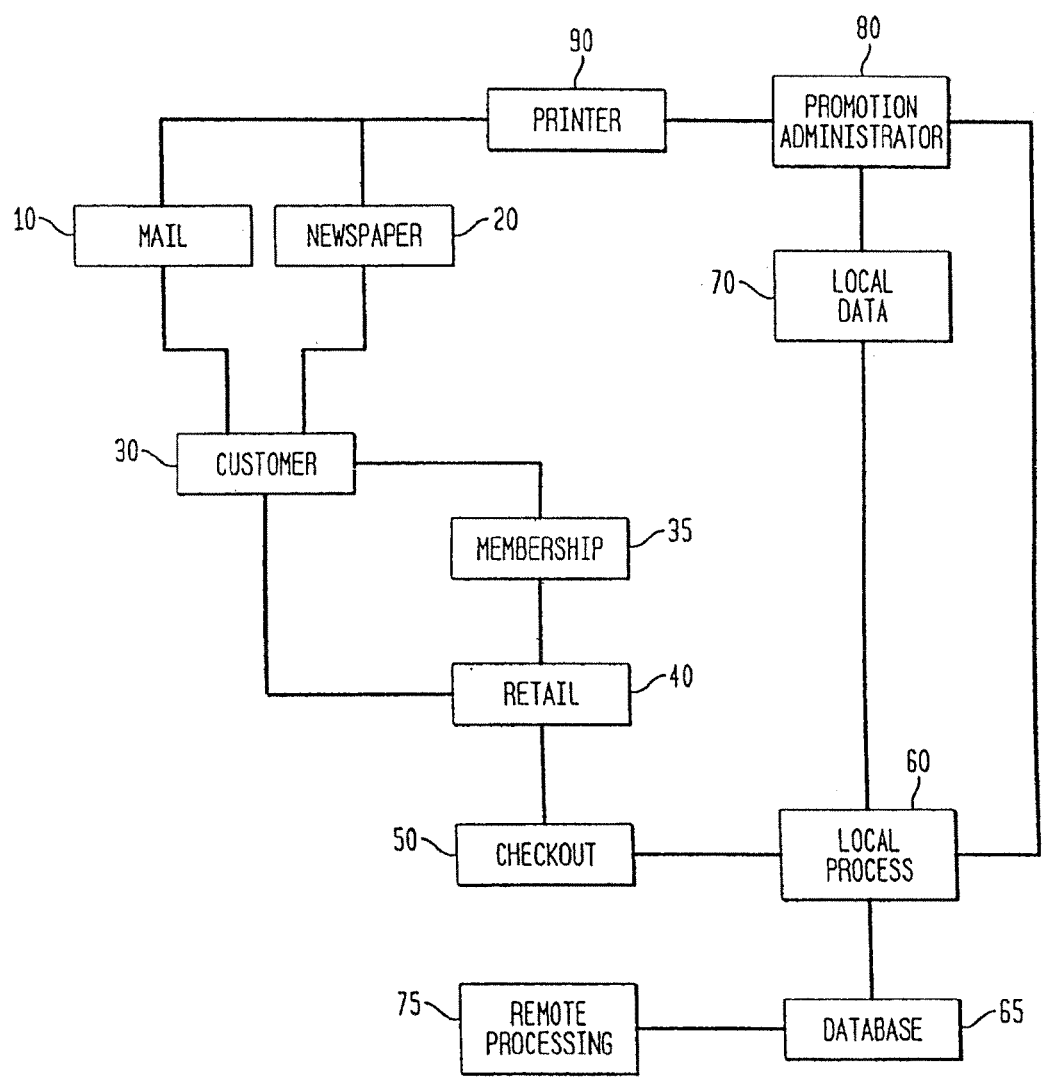
FIG. 1 is a functional block diagram of a the present invention.

Recognizing the significant operational details directed to select variations of system operation provided in the parent case, the discussion below is used to expand and amplify on a subset of these features. With this in mind, FIG. 1 provides a generalized functional block diagram wherein the Customer, block 30, receives the multi-coupon vehicle via one of two paths, Mail Distribution block 10, or Newspaper/Magazine, block 20. Generally, distribution is accomplished as a stand-alone insert into the periodical or mailer. In some circumstances, however, it is advantages to couple the vehicle with a primary promotion, such as a circular for a local supermarket.

It is important to note, as presented here, the operation is cyclic, so that customer responses are used as a measure to allow feedback control of feature promotions, via Administrator 80, and Printer 90. Said differently, as multi-coupon vehicles are presented for redemption, the system processes this data which is then applied to re-characterize the parameter for the next round of multi-coupon vehicles. Parameters subject to feedback control include target customers, scale of discount, graphics on the vehicle, and the like.

Continuing with FIG. 1, Customer 30, visits the Retail Store 40, armed with the multicoupon vehicle. During the checkout process, block 50, the multi-discount vehicle (MDV) is scanned and processed with that transaction. The MDV is checked for authenticity, and items purchased that are subject to discount are tracked with the total amount charged to that customer adjusted accordingly.

In addition, select data, embedded into the code and locally generated (e.g., current data) are parsed and sent to local, real time processing, clock 60. This information is flagged for immediate assessment, and sent to local database 70. The entered and complete data set from checkout is sent to a remote/separate database 65, and is available for subsequent/batch processing at some future time, block 75.

Finally, Promotion Administrator, block 80, receives local processed information and/or remote processed information. This is applied to adjust the format and attributes of the MDV for the next cycle, via printer, block 90.

A variation of the above sequence is accomplished by using the MDV with a user independent code, and coupling operation with the existing store membership card that uniquely identifies the user during checkout, block 35. Several benefits flow from bifurcating the code between the MDV and the membership card in this way. First, processing is accomplished via existing scanning and data tracking protocols already in operation in the store environment. Second, and perhaps more economically important, the MDV may be printed en masse with an individual code for the block run—but not for each individual vehicle. Said somewhat differently, the MDV code will be the same for the promotion run—thus avoiding the expense of individually coding each MDV.

Figure 2:
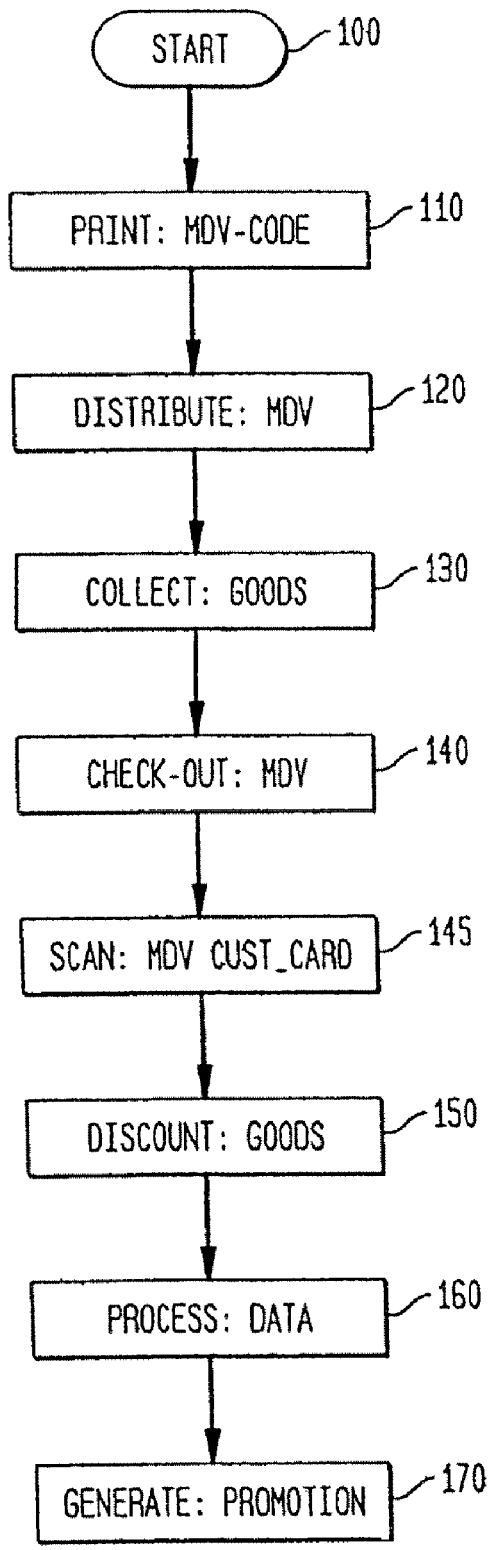
FIG. 2 is a simplified flow chart depicting the sequence of system operation of FIG. 1.

A sample processing sequence is provided in FIG. 2. Beginning with Start Block 100, logic continues to block 110, wherein the MDV is printed with a select code. In accordance with the above process, the same code is placed on plural vehicles for a single promotion, and no customer identification is provided within the code. At block 120, the MDV is distributed as a fold-out from a store sponsored circular inserted into a weekly village newspaper. As printed, the vehicle includes 20 separate discount coupon like images organized within the folded structure of vehicle. In addition, the vehicle provides a shopping list of all the promoted products and a tally to allow tracking of the accumulated savings made with the vehicle during a shopping trip.

Continuing with FIG. 2, at block 130, a customer/newspaper subscriber takes the MDV to the sponsoring supermarket, collecting some or all of the promoted goods using the shopping list as a guide. At check-out, block 140, the customer purchases the items selected during the shopping visit, and the system scans both the vehicle code, and the customer membership card, block 145. The checkout is completed by providing the customer the discounts found on the vehicle and storing the data collected during the scanning operation, block 150.

At block 160, the stored data including information about the discounted amount provided to the customer by the store are passed to the clearance facility, and the amount is reimbursed to the supermarket. The MDV is discarded. Information regarding the transaction is presorted to track real time variables necessary for select store processes. The remaining data is filtered and aggregated with other transactions and used to guide the creation of the next promotion, block 170.

Figure 3A:
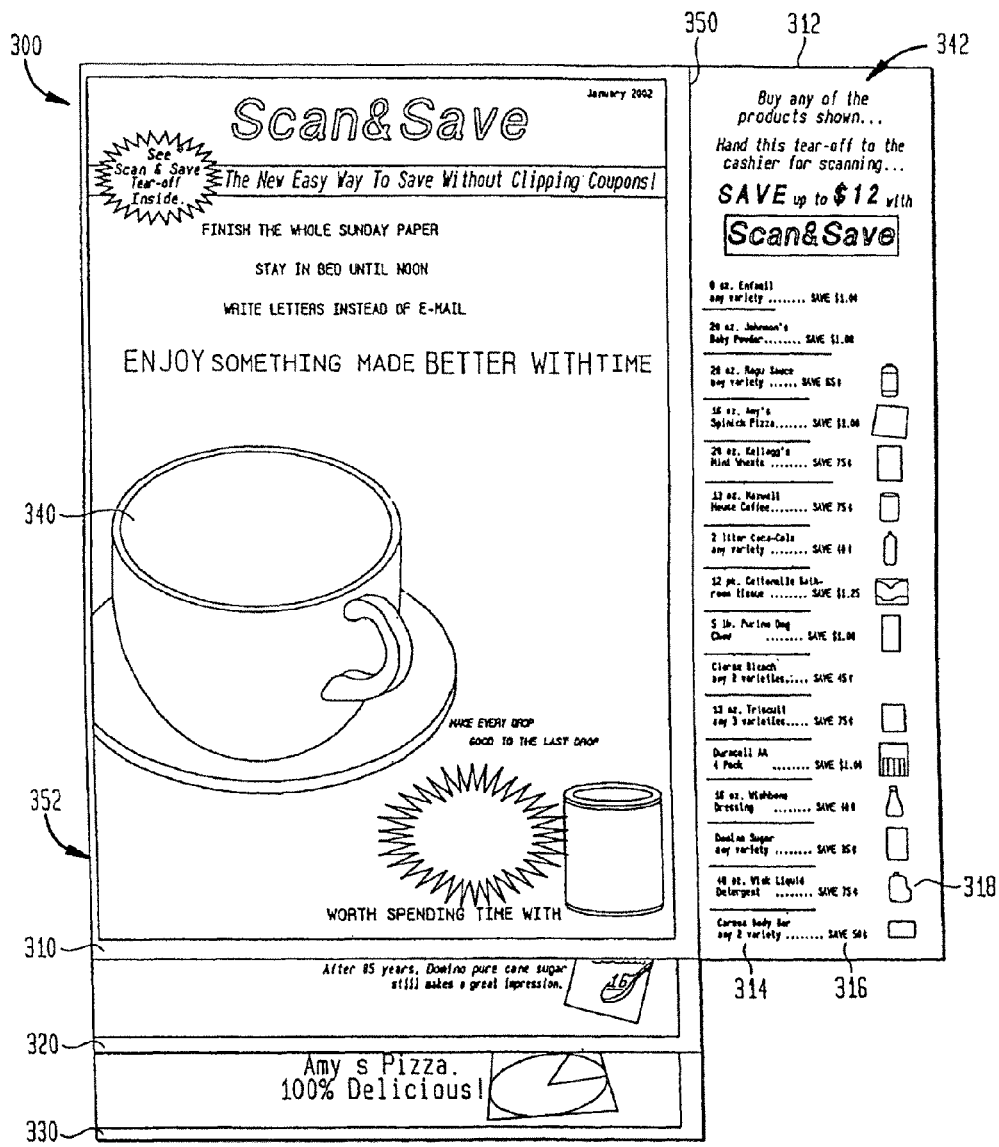
FIG. 3a is a front vertically exploded view of a multi-coupon vehicle for use as a freestanding insert of a preferred embodiment of the present invention.
Figure 3B:
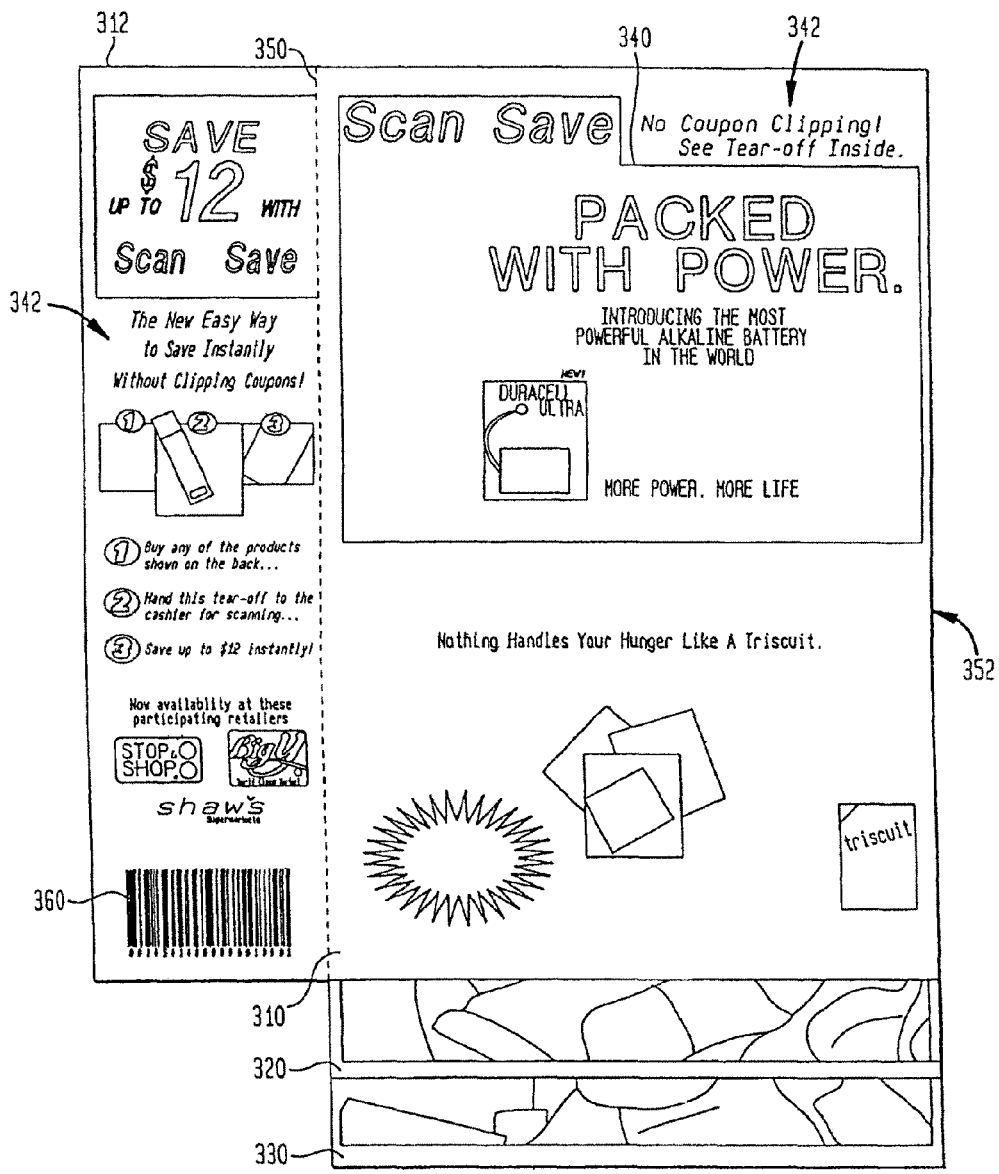
Figure 3C:
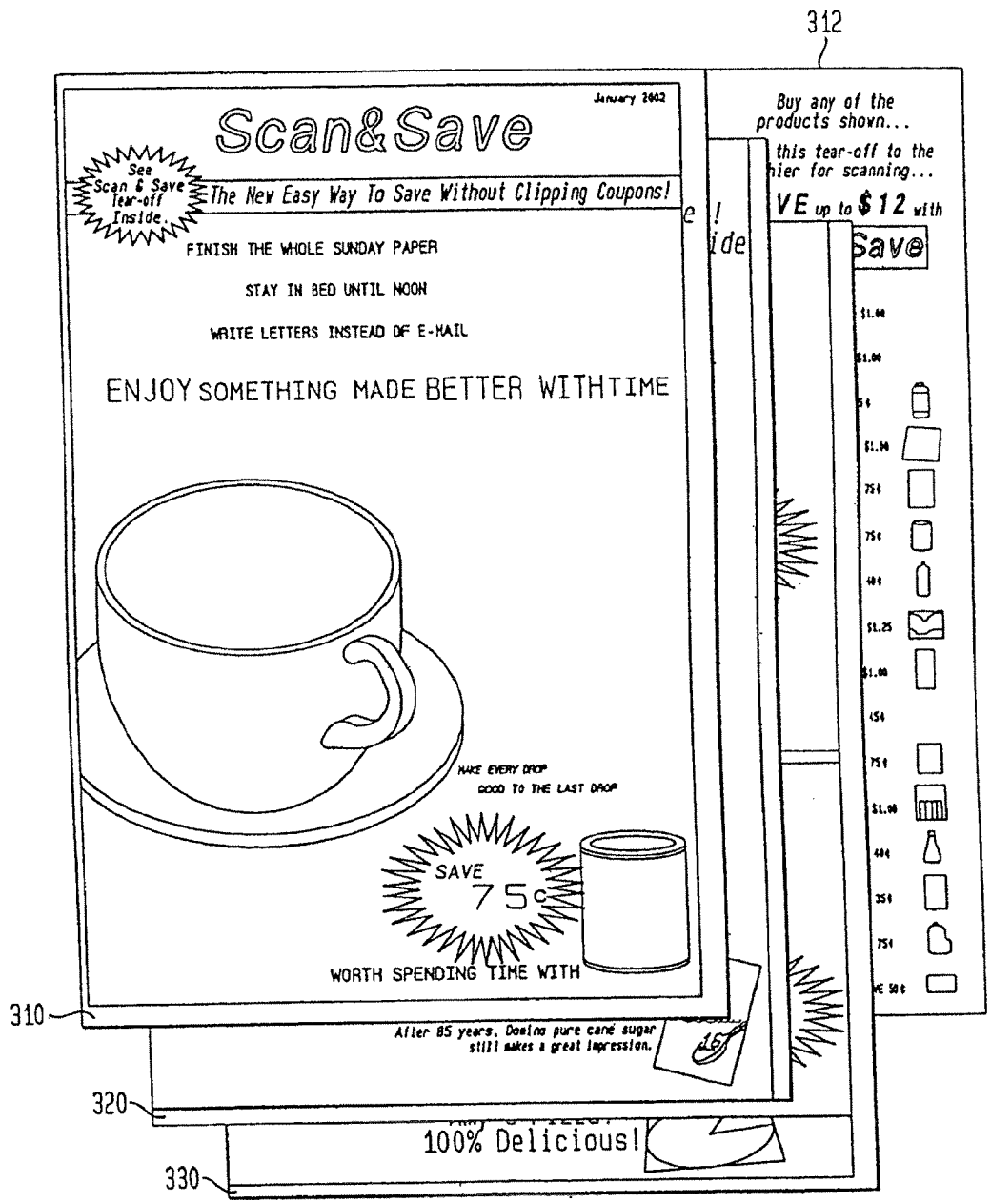

Turning now to FIGS. 3*a-c*, one embodiment of the MDV is provided in the form of a freestanding insert (FSI) 300. The FSI may generally take the form of a folded sheets 310, 320, 330 unattached to each other (FIGS. 3*a-c*). Each sheet presents graphically displayed information, is folded or creased 352, and may include at least one advertisement or commercial 340 of a discounted product. FSI is preferably placed in a newspaper for dissemination to potential customers.

A redemption vehicle 312 is shown attached to one of the sheets, but may be attached to any of the sheets, in any position, may be printed on any portion, or may simply be loose and separate altogether. The redemption vehicle may include a barcode 360 or other readable medium, a description 314 of the discounted or sale-priced items, a picture or other representation 318 of the items, and/or the price or discount 316 of the items. Additionally, the redemption vehicle may include other miscellaneous information 342, such as but not limited to instructions, advertisements, commercials, names of participating retailers, etc., and may even be organized under headings representing categories or store isle. In order to avoid the inconvenience of carrying the entire FSI to the participating store, the redemption vehicle may include perforations 350 or other means of separation. This is possible because the redemption vehicle includes sufficient information of all the discounted products to allow the customer to recognize these products and receive the discount at check-out. Thus the inconvenience of cutting and carrying individual coupons for each and every product is also avoided.

Figure 4A:
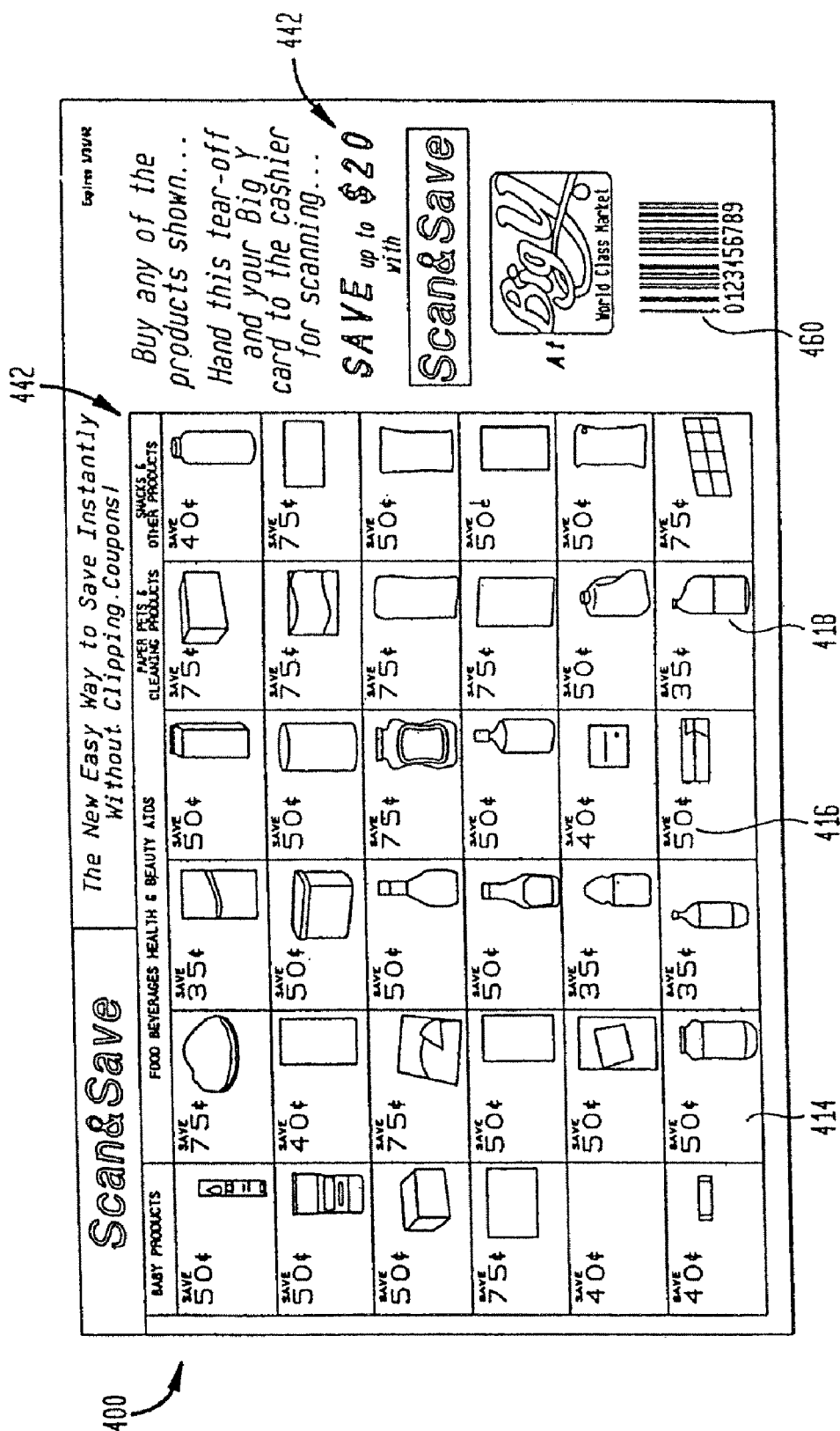
FIG. 4a is a front view of a multi-coupon vehicle of an alternate preferred embodiment of the present invention.
Figure 5A:
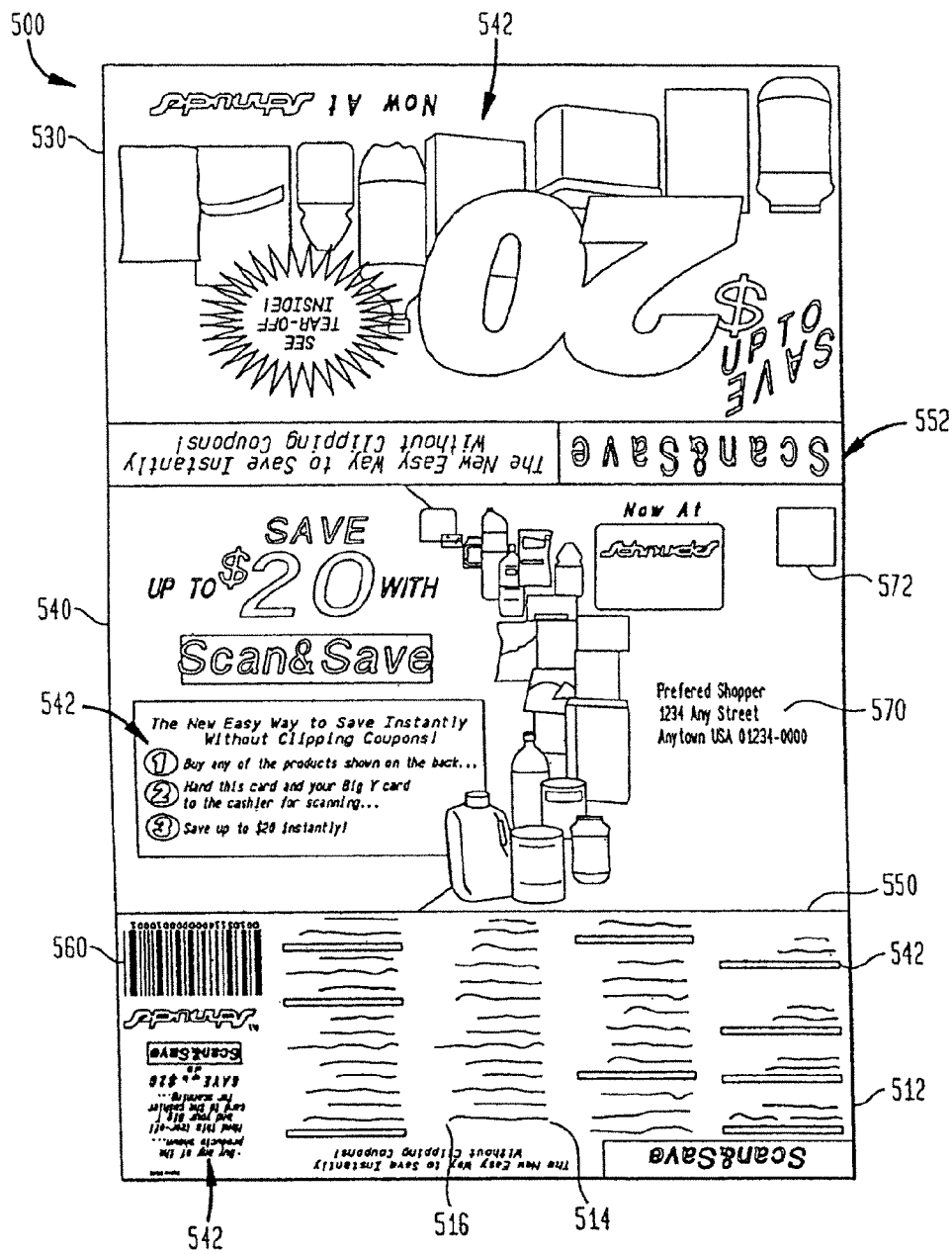
FIG. 5a is a front view of a multi-coupon vehicle of another alternate preferred embodiment of the present invention.
Figure 5B:
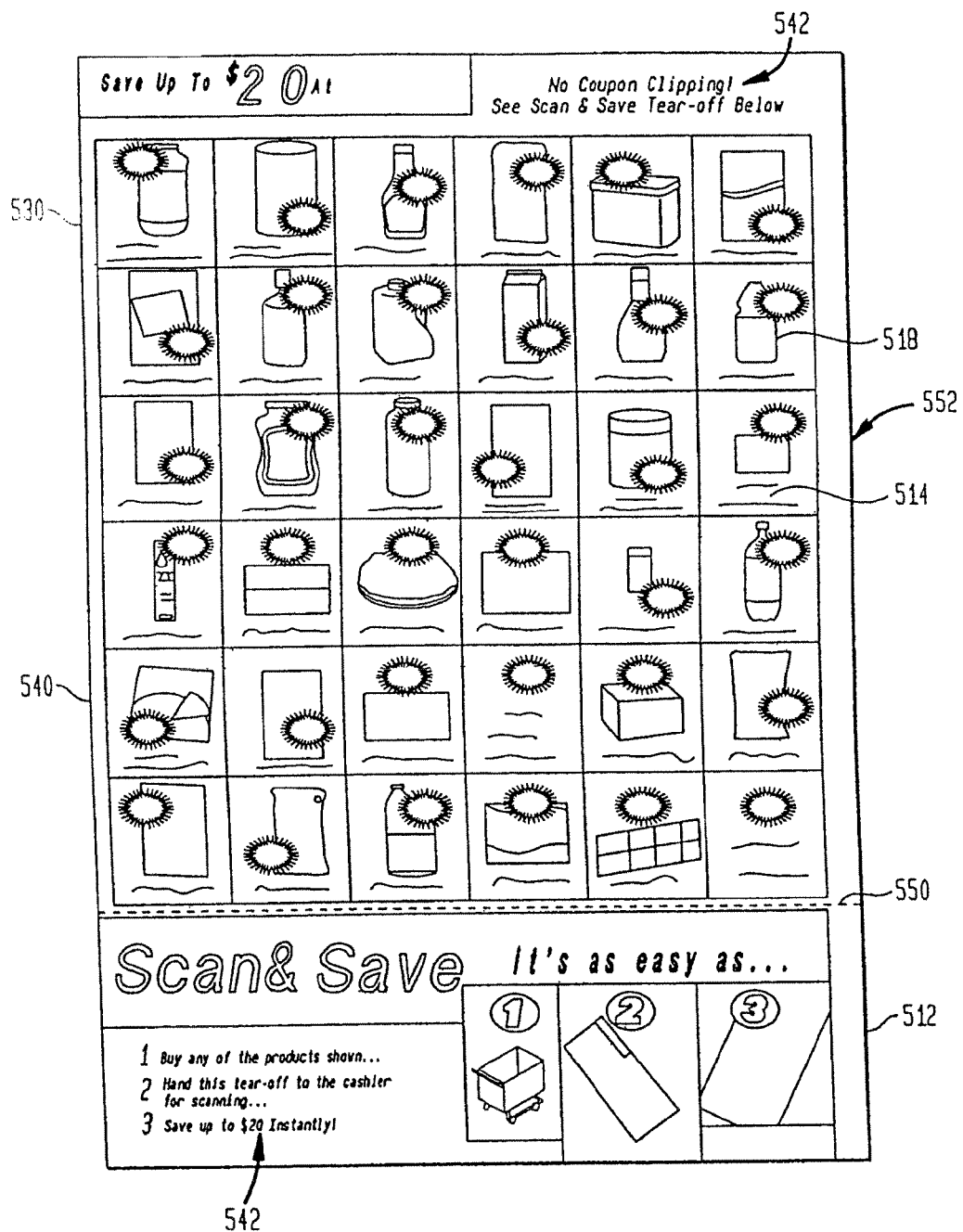
Figure 5C:
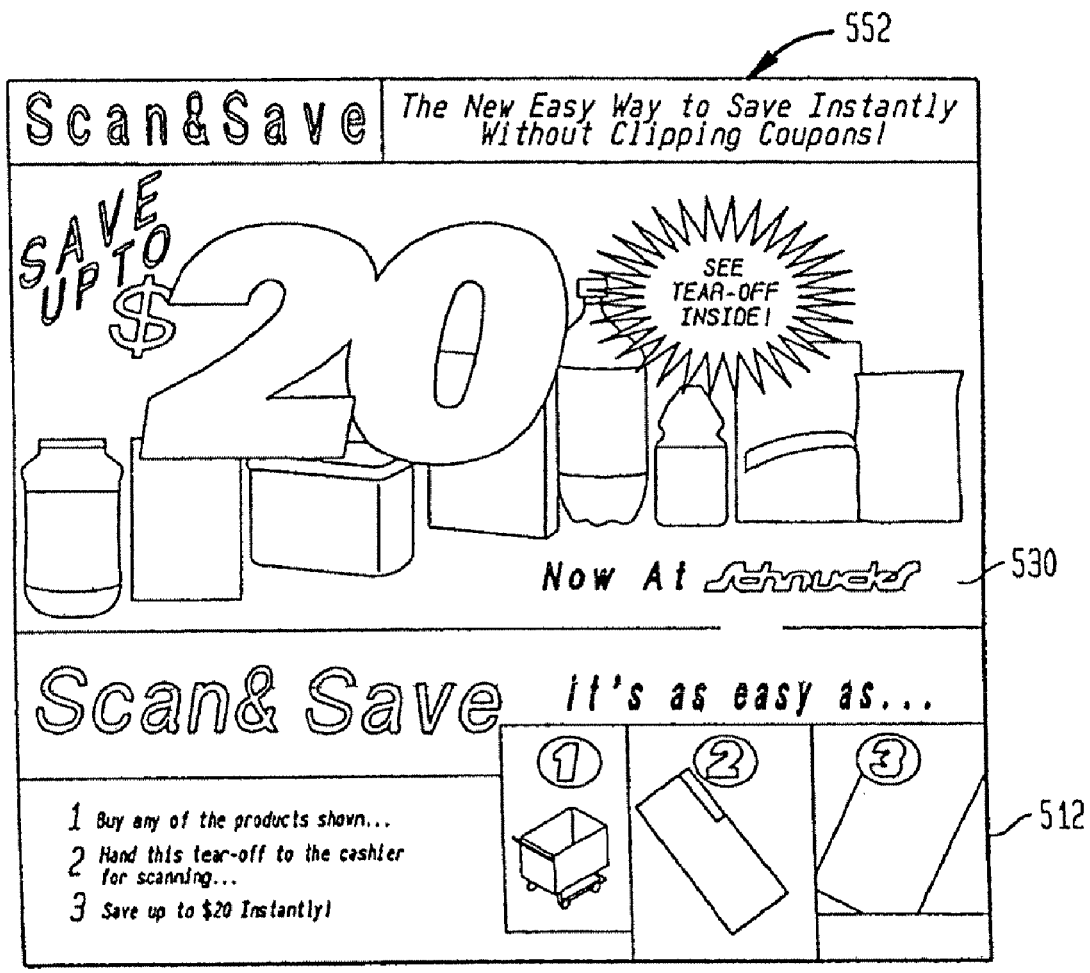
FIG. 5c is a rear view of the multi-coupon vehicle of FIG. 5a with a folded down top portion.
Figure 5D:
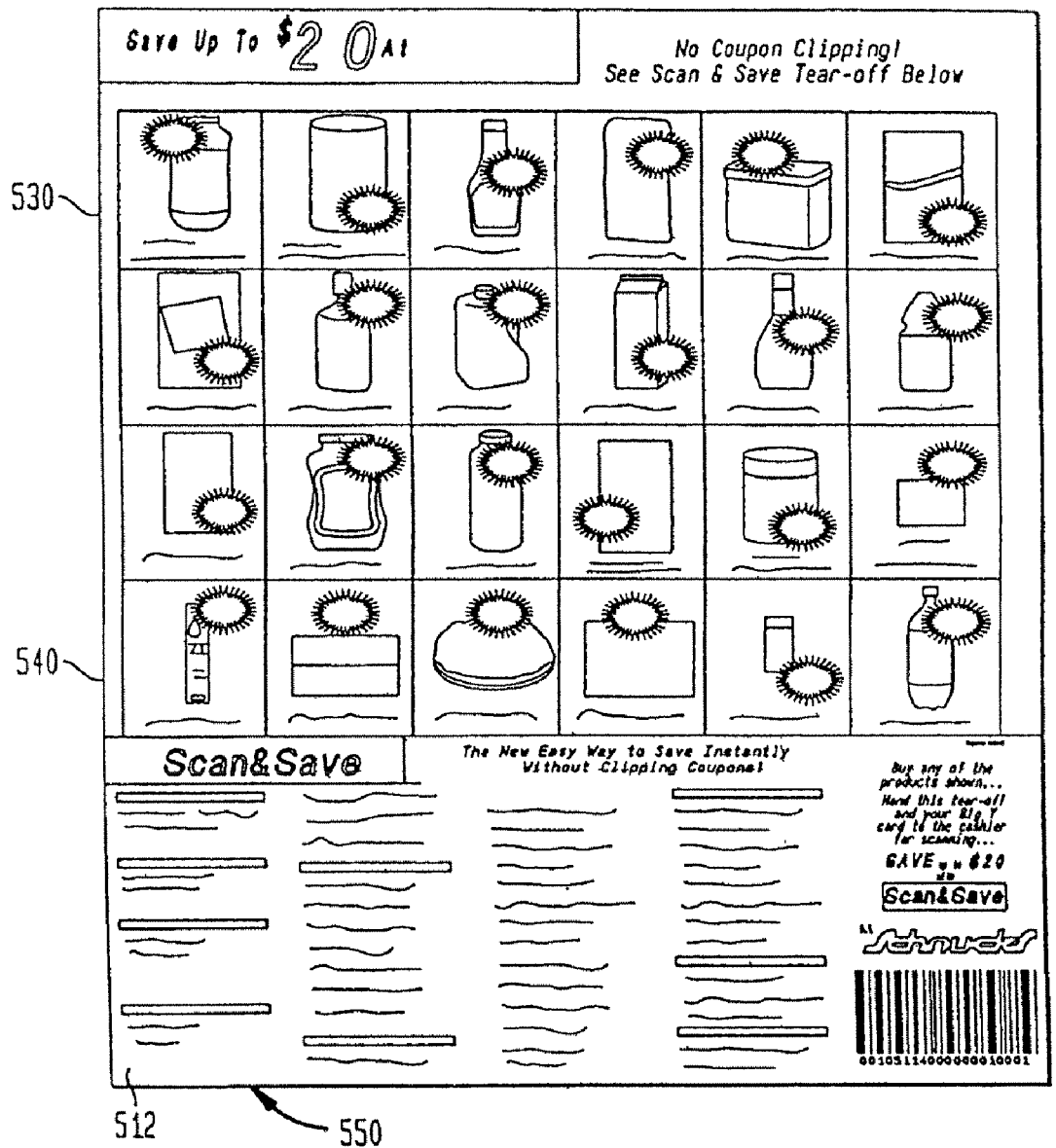
FIG. 5d is a rear view of the multi-coupon vehicle of FIG. 5a with a folded down redemption vehicle.

FIGS. 4*a* and 4*b* depict an alternate embodiment of the MDV, provided in the form of a flat card (FC) 400. The FC may generally take the form of single sheet or card of any size or shape, and may include a barcode 460 or other readable medium, a description 414 of the discounted or sale-priced items, a picture or other representation 418 of the items, and/or the price or discount 416 of the items. Additionally, the FC may include other miscellaneous information 442, such as but not limited to instructions, advertisements, commercials, names of participating retailers, etc., and may even be organized under headings representing categories or even store isles. Since the FC includes sufficient information of all the discounted products to allow the customer to recognize these products and receive the discount at check-out, the inconvenience of cutting and carrying individual coupons for each and every product is also avoided. The FC may be distributed as a mailer, and therefore include the name and address 470 of the customer and the postage 472. While the FC may most often be distributed by mail, it would be evident to one of ordinary skill that the FC may be distributed as a flyer, in a newspaper or other publication, or any other practical manner of distribution.

FIGS. 5*a-d*, depict yet another alternate embodiment of the MDV, is provided in the form of a folded card (FLDC) 500. The FLDC may generally take the form of a folded sheet or card of any size or shape, and may include a fold or crease 552 provided between an upper-portion 530 and a lower-portion. While shown with only two portions, it would be evident to one of ordinary skill in the art that the number of portions and creases may vary. The FLDC may be distributed as a mailer, and therefore include the name and address 570 of the customer and the postage 452. While the FLDC may most often be distributed by mail, it would be evident to one of ordinary skill that the FLDC may be distributed as a flyer, in a newspaper or other publication, or any other practical manner of distribution.

A redemption vehicle 512 is shown attached to the lower-portion, but may be attached to any portion in any position, may be printed on any portion, or may simply be loose and separate altogether. The redemption vehicle may include a barcode 560 or other readable medium, a description 514 of the discounted or sale-priced items, a picture or other representation 518 of the items, and/or the price or discount 516 of the items. Additionally, the redemption vehicle may include other miscellaneous information 542, such as but not limited to instructions, advertisements, commercials, names of participating retailers, etc., and may even be organized under headings representing categories or store isles. In order to avoid the inconvenience of carrying the entire FLDC to the participating store, the redemption vehicle may include perforations 550 or other means of separation. This is possible because the redemption vehicle includes sufficient information of all the discounted products to allow the customer to recognize these products and receive the discount at check-out. Thus the inconvenience of cutting and carrying individual coupons for each and every product is also avoided.

Figure 6A:
FIG. 6a is a front view of a multi-coupon vehicle of another alternate preferred embodiment of the present invention.
Figure 6A:
Figure 6B:

The foregoing system implementations may be more fully appreciated in the context of an illustrative example of operation within a retail environment. Referring first to FIGS. 6*a* and 6*b*, a selectively constructive MDV is depicted for use for promoting multiple products for purchase at a super market. The MDV is a single sheet stock having two sides—front and back illustrated by FIGS. 6*a* and 6*b*, respectively—for receiving printed information regarding a plurality of products and/or services typically available from a super market retail outlet.

The front side of the MDV, shown in FIG. 6*a*, presents, in the upper portion, an overview of the MDV to provide the user with introductory information about the MDV. For example, the MDV is depicted as providing discounts for certain specific products. The MDV is further shown as having some relation to conventional discount coupons by the illustration of such coupons on the front side. Additional features of the MDV are indicated by the upper portion of the front side, such as multiple discounts being provided by the single MDV ("20

Offers on One Page"), a single expiration date for all such discounts, and machine-readability of the MDV ("Quick Scan").

The lower portion of the front side of the MDV, shown in FIG. 6a, contains more specific information regarding the MDV. For example, the lower portion indicates where the MDV can be redeemed ("Available at Rockford area Iogli"). Also, the lower portion provides more specific directions for the use of the MDV by a consumer ("1, 2, 3"). Also, the lower portion provides the expiration date of the MDV ("Jan. 31, 2003").

The upper portion of the back side of the MDV, shown in FIG. 6b, provides details regarding the specific discounts offered by the MDV. Photo reproductions of the specific products for which discounts are offered are included in the upper portion to facilitate recognition of the products by the consumer. The photo reproductions also facilitate location of the products in the retailer's facility by providing the consumer with a visual image for which to search in the facility.

The lower portion of the back side of the MDV, shown in FIG. 6b, contains a list of each of the products for which a discount is provided by the MDV. Next to each of the product names are printed two boxes. The boxes provide locations for the consumer to mark, such as by placing an "x" or "check", to indicate that a particular product is desired and that the MDV has been redeemed for a particular product. For example, the box to the immediate left of each named product may be marked to indicate that the discount has been redeemed, and the box to the left of that box may be marked to indicate that the purchase of the product is desired. This provides a left-to-right chronological sequence to the boxes since identification of the desire to purchase normally precedes the actual purchase. This enables the consumer to track the discounts of the MDV which have been used and those which remain available.

The lower portion also contains a bar code which may be scanned by a conventional bar code scanner. Additionally, the lower portion indicates the expiration date of the MDV ("Jan. 31, 2003") and, to the right thereof, additional conditions associated with the MDV ("One use per product. Offers cannot be doubled. . . . ").

The MDV may be incorporated into the page of a magazine such that the MDV defines the outer portion of the page and has an outer edge which defines at least a portion of the outer edge of the page. Such an MDV has an interior edge which is perforated to enable ready detachment, such as by tearing, of the MDV from the inner portion of the page of the magazine. Detachment of the MDV from the page of the magazine results in the interior edge of the MDV, which was previously perforated, being serrated.

In a related embodiment of the MDV, the MDV may be incorporated into a free-standing insert, such as an advertising circular which may be inserted into a newspaper. An example of such a free-standing insert is a large sheet which is folded to define sections where one of such sections has the MDV incorporated therein. Such an MDV is incorporated into a section of the circular in a similar manner as the page of a magazine, as described in the preceding. Such an MDV has a perforated interior edge to enable ready detachment from the circular.

In preparation, the MDV is further provided with a unique code utilizing a bar code structure, during its printing. In either event, each MDV is coded so as to be uniquely identified and tracked during its usage.

In operation, the MDV of FIGS. 6a and 6b is distributed to potential customers through the use of newspaper insert. Specifically, the MDV is inserted into the folds of the newspaper that is otherwise delivered or available for sale within the geographic region of a sponsoring or participating super market. In this way, the MDV ends up with a potential customer or customer family and can be quickly evaluated in terms of the savings offered on the plural products promoted on the MDV.

In this example, the customer retains the MDV, and uses it to assist in his next shopping trip to the super market. Passing through the product isles, the customer can quickly and easily identify those products to which a discount applies. The MDV allows for easy tracking of the selected items by the customer during the selection process.

At check-out, the super market employs conventional scanning equipment to read both the MDV and the products selected by the customer for purchase. The scanning equipment is connected to a computer that compares the purchases with a file storing information regarding the products promoted with the MDV. This comparison is facilitated by the unique identifier provided on the MDV, which comports the promotion to the stored file. As promoted items listed on the MDV are scanned during checkout, the system flags these items as purchased and applies the discount to the price provided to the customer. The computer may thereafter deactivate the promotion for that product to insure that the MDV is not used again to duplicate the discount for the purchased items. The MDV, however, remains active to the extent promoted items were not purchased by the customer during this or previous shopping visits, and the time period set for the promotion has not expired (typically 45 to 90 days). This, of course, allows the customer to return to the store with the MDV and to take advantage of the remaining promotions on the MDV that have not been used.

The super market computer thereafter aggregates the purchases of promoted items and the discounts provided to its customers. During a selected interval, these aggregate promotions are segregated by their sponsoring agents—typically the manufacturers—and reimbursement files are sent to a clearinghouse or directly to the agent. Confirmation of the purchases permits the reimbursement of the promotion/discounts back to the super market by the clearinghouse/agent with confidence that no fraud has taken place, while avoiding the need for a physical coupon or similar.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. A data processing system for tracking and processing a plurality of in-store discounts to potential purchasers of plural products during the checkout process wherein said discounts are each associated with a specific one of said plural products, said system comprising:

a discount vehicle, characterized by two or more of said discounts, including descriptive material to provide information at least identifying the products and their associated discounts, wherein said vehicle is associated with a select code that permits tracking of said vehicle during checkout, said code uniquely identifying all the discounts for all of the plural products associated with the vehicle;

a checkout processing terminal including computer based tracking of individual purchasers' purchased products and the prices thereof, wherein said processing terminal includes a device for receiving the code associated with the vehicle during checkout; and a data processor attached to said checkout terminal for receiving information regarding transactions associated with checkout, selected products and the discounts associated with the code associated with said vehicle forming a part of the transactions, and processing said discounts in accord with said code;

wherein said data processor selectively deactivates the code for only particular discounts, of the plurality of discounts, associated with the purchased products by redemption of the code associated with the vehicle such that the code remains active for future use with yet unused ones of the plurality of discounts associated with said plural products, said data processor being further connected to memory for storing data associated with said transaction.

2. The system of claim 1 further comprising a membership card including a unique customer identification code for facilitating system transactions.

3. The system of claim 1 wherein said checkout processing terminal includes machine based code reading equipment for scanning said code associated with said vehicle and entering into memory information associated with said code.

4. The system of claim 1 wherein said processor includes programming to permit data presorting upon scanning during checkout, to track real time variables for selected store processes.

5. The data processing system of claim 1, wherein the discount vehicle includes additional information selected from a group including instructions, advertisements, commercials, names of participating retailers, category headings, and store aisles numbers.

6. A data processing system according to claim 1 wherein said select code becomes inactive for attaining identified discounts after a predetermined time.

7. A data processing system according to claim 1, wherein the single select code is associated with a unique customer identification code of a machine-readable card.

8. A data processing system according to claim 7, wherein the single select code is associated with the customer identification code responsive to a telecommunication system or electronic media.

9. A data processing system according to claim 7, wherein the machine-readable card is a loyalty or membership card.

10. A data processing system according to claim 7, wherein the machine-readable card is a credit card or a debit card.

11. The data processing system of claim 1, wherein said select code reflects at least one of varying discounts unique to a potential purchaser, and identical discounts common to all potential purchasers.

12. The data processing system of claim 1, wherein the data processor is for preventing or permitting increasing a value of one or more of the discounts when a separate coupon is presented in combination with the discount.

13. The data processing system of claim 1, wherein the data processor is for discriminating between individual ones of the plural products and sizes of the products using a UPC code of the individual ones of the products.

14. The data processing system of claim 1, wherein the data processor is for listing the products of the discount vehicle and their associated discounts.

15. A discount vehicle for use with a data processing system for tracking and processing a plurality of in-store discounts to potential purchasers of plural products during the checkout process, wherein said discounts are each associated with a specific one of said plural products, said discount vehicle comprising:

two or more of said discounts including descriptive material to provide information at least identifying the products and their associated discounts, wherein said vehicle is associated with a select code that permits tracking of said vehicle and of individual purchasers' purchased products and the prices thereof during checkout, said select code uniquely identifying all the discounts for all of the plural products associated with said vehicle, and said select code uniquely identifying said vehicle such that said select code can be selectively deactivated for only particular discounts, of the plurality of discounts, associated with the purchased products by redemption of the code associated with the vehicle such that the code remains active for future use with yet unused ones of the plurality of discounts associated with said plural products.

16. The discount vehicle according to claim 15, further comprising a freestanding insert including a plurality of sheets, wherein said plurality of sheets are placed in a newspaper for distribution to a potential customer.

17. The discount vehicle according to claim 16, further including additional information selected from a group including instructions, advertisements, commercials, names of participating retailers, category headings, and store aisles numbers.

18. The discount vehicle according to claim 16, wherein said list includes at least one representation of each of said plural products selected from a group including an image, written description, sale price, discount amount, name, slogan, and trademark.

19. A discount vehicle according to claim 15 wherein said select code becomes inactive for attaining identified discounts after a predetermined time.

20. The discount vehicle of claim 19, wherein the discount vehicle includes additional information selected from a group including instructions, advertisements, commercials, names of participating retailers, and category headings.

21. A discount vehicle according to claim 15 and further comprising a checklist printed thereon, said checklist containing a list of all discounts provided by said vehicle, said checklist being printed on a surface of said vehicle on which visible marks may be made for tracking of discounts used by redemption of said vehicle.

22. A discount vehicle according to claim 15, wherein the single select code is associated with a unique customer identification code of a machine-readable card.

23. A discount vehicle according to claim 22, wherein the single select code is associated with the customer identification code responsive to a telecommunication system or electronic media.

24. A discount vehicle according to claim 22, wherein the machine-readable card is a loyalty card, a membership card, a credit card or a debit card.

25. The discount vehicle of claim 15, wherein said select code reflects at least one of varying discounts unique to a potential purchaser, and identical discounts common to all potential purchasers.

26. The discount vehicle of claim 15, further comprising a pre-selected list of the plural products and their associated discounts.

27. The discount vehicle of claim 15, wherein the discount vehicle is for distribution by a telecommunication system or electronic media.

28. A data processing system for tracking and processing a plurality of in-store discounts to potential purchasers of plural products during the checkout process wherein said discounts are each associated with a specific one of said plural products, said system comprising:
- a discount vehicle, characterized by two or more of said discounts, including descriptive material to provide information at least identifying the products and their associated discounts;
- a customer account associated with a customer identification code, the customer account comprising two or more of said discounts of the discount vehicle selected by a customer to be associated with the customer account, the customer account being associated with a select code that permits tracking of said customer account during checkout, said code uniquely identifying all the discounts for all of the plural products associated with the customer account;
- a checkout processing terminal including computer based tracking of individual purchasers' purchased products and the prices thereof, wherein said processing terminal includes a device for receiving the customer identification code and the select code associated with the customer account during checkout; and
- a data processor attached to said checkout terminal for receiving information regarding transactions associated with checkout, selected products and the discounts associated with the code associated with the customer account forming a part of the transactions, and processing said discounts in accord with said code;
- wherein said data processor selectively deactivates the code for only particular discounts, of the plurality of discounts, associated with the purchased products by redemption of the code associated with the customer account such that the code remains active for future use with yet unused ones of the plurality of discounts associated with said plural products, said data processor being further connected to memory for storing data associated with said transaction.

29. The data processing system of claim 28, wherein the customer identification code is also used as the customer account select code.

30. The data processing system of claim 28, wherein the customer identification code is associated with a loyalty card, a membership card, a credit card, or a debit card.

* * * * *